(12) United States Patent
Witz et al.

(10) Patent No.: US 9,764,530 B2
(45) Date of Patent: Sep. 19, 2017

(54) METHOD FOR OBTAINING A CONFIGURATION FOR JOINING A CERAMIC MATERIAL TO A METALLIC STRUCTURE

(71) Applicant: ALSTOM Technology Ltd, Baden (CH)

(72) Inventors: Gregoire Etienne Witz, Birmenstorf (CH); Matthias Hoebel, Windisch (CH); Hans-Peter Bossmann, Lauchringen (DE)

(73) Assignee: ANSALDO ENERGIA IP UK LIMITED, London (GB)

( * ) Notice: Subject to any disclaimer, the term of this patent is extended or adjusted under 35 U.S.C. 154(b) by 116 days.

(21) Appl. No.: 14/250,665

(22) Filed: Apr. 11, 2014

(65) Prior Publication Data
US 2014/0308539 A1    Oct. 16, 2014

(30) Foreign Application Priority Data
Apr. 12, 2013    (EP) .................................... 13163603

(51) Int. Cl.
*B32B 7/08* (2006.01)
*B23K 26/34* (2014.01)
(Continued)

(52) U.S. Cl.
CPC .................. *B32B 7/08* (2013.01); *B23K 1/19* (2013.01); *B23K 26/032* (2013.01);
(Continued)

(58) Field of Classification Search
CPC .... B23K 26/032; B23K 26/203; B23K 26/12; B23K 26/32; B23K 26/3273;
(Continued)

(56) References Cited

U.S. PATENT DOCUMENTS

| 4,728,257 A | 3/1988 | Handschuh |
| 4,890,783 A | 1/1990 | Li |

(Continued)

FOREIGN PATENT DOCUMENTS

| DE | 10 2010 060 944 | 4/2012 |
| DE | 10 2011 077 620 | 12/2012 |

(Continued)

OTHER PUBLICATIONS

Machine translation of Japan Patent document No. 5-231,569, Feb. 2016.*

*Primary Examiner* — Geoffrey S Evans
(74) *Attorney, Agent, or Firm* — Buchanan Ingersoll & Rooney PC

(57) ABSTRACT

A configuration for joining a ceramic layer has a thermal insulating material to a metallic layer. The configuration includes an interface layer made of metallic material located between the ceramic layer and the metallic layer, which includes a plurality of interlocking elements on one of its sides, facing the ceramic layer, the ceramic layer comprising a plurality of cavities aimed at connecting with the corresponding interlocking elements of the interface layer. The configuration also includes a brazing layer by means of which the interface layer is joint to the metallic layer. The invention also refers to a method for obtaining such a configuration.

10 Claims, 6 Drawing Sheets

(51) Int. Cl.
| | |
|---|---|
| *B32B 18/00* | (2006.01) |
| *C04B 37/02* | (2006.01) |
| *F23R 3/00* | (2006.01) |
| *B23K 26/03* | (2006.01) |
| *B23K 26/211* | (2014.01) |
| *B23K 26/60* | (2014.01) |
| *B23K 26/32* | (2014.01) |
| *B23K 1/19* | (2006.01) |
| *B23K 26/342* | (2014.01) |
| *B23K 103/00* | (2006.01) |
| *B23K 103/16* | (2006.01) |

(52) U.S. Cl.
CPC ............ *B23K 26/211* (2015.10); *B23K 26/32* (2013.01); *B23K 26/342* (2015.10); *B23K 26/60* (2015.10); *B32B 18/00* (2013.01); *C04B 37/026* (2013.01); *F23R 3/007* (2013.01); *B23K 2203/172* (2015.10); *B23K 2203/52* (2015.10); *C04B 2235/945* (2013.01); *C04B 2237/12* (2013.01); *C04B 2237/592* (2013.01); *C04B 2237/595* (2013.01); *C04B 2237/64* (2013.01); *C04B 2237/72* (2013.01); *F23M 2900/05004* (2013.01); *Y10T 428/12618* (2015.01)

(58) Field of Classification Search
CPC .. B23K 26/421; B23K 26/60; B23K 2203/52; B23K 2203/18; C04B 37/026; C04B 2237/12; C04B 2237/59; C04B 2237/595; C04B 2237/592; C04B 2237/64; B22F 3/1055; B22F 3/1103
See application file for complete search history.

(56) References Cited

U.S. PATENT DOCUMENTS

| | | | | |
|---|---|---|---|---|
| 5,290,333 | A * | 3/1994 | Nied | C04B 35/62665 216/34 |
| 5,703,341 | A * | 12/1997 | Lowndes | B23K 26/34 219/121.66 |
| 5,993,549 | A * | 11/1999 | Kindler | B05B 7/22 118/308 |
| 6,164,916 | A * | 12/2000 | Frost | B23K 35/3046 148/528 |
| 6,255,621 | B1 * | 7/2001 | Lundquist | G11B 5/102 219/121.69 |
| 7,043,330 | B2 * | 5/2006 | Toyserkani | B23K 26/032 219/121.6 |
| 7,985,458 | B2 * | 7/2011 | Matsusaki | B28D 5/0011 428/156 |
| 2002/0146541 | A1 * | 10/2002 | Fried | B22C 7/02 428/172 |
| 2005/0133527 | A1 * | 6/2005 | Dullea | B05B 7/14 222/1 |
| 2005/0214121 | A1 | 9/2005 | Bostanjoglo et al. | |
| 2010/0215984 | A1 * | 8/2010 | Oiwa | B23K 35/0244 428/680 |
| 2011/0088260 | A1 * | 4/2011 | Yoshioka | B22F 7/062 29/888 |
| 2011/0103967 | A1 * | 5/2011 | Hoebel | B23K 35/304 416/241 R |
| 2012/0126457 | A1 * | 5/2012 | Abe | B22F 3/1055 264/460 |
| 2013/0101761 | A1 * | 4/2013 | Bunker | F01D 5/288 428/34.1 |
| 2013/0177740 | A1 * | 7/2013 | Merrill | B22F 7/002 428/158 |
| 2014/0017415 | A1 * | 1/2014 | Lin | C23C 26/00 427/580 |
| 2014/0242408 | A1 * | 8/2014 | Brandl | B32B 15/043 428/601 |
| 2015/0037162 | A1 * | 2/2015 | James | F01D 5/3061 416/220 R |

FOREIGN PATENT DOCUMENTS

| | | |
|---|---|---|
| EP | 1 340 583 | 9/2003 |
| EP | 2 113 583 | 11/2009 |
| JP | 59-128277 A * | 7/1984 |
| JP | 62-003834 A * | 1/1987 |
| JP | 63-011242 A * | 1/1988 |
| JP | S63-288976 A | 11/1988 |
| JP | 5-231569 A * | 9/1993 |
| JP | 2002-141667 A * | 5/2002 |
| JP | 2005-537934 | 12/2005 |
| JP | 2006-043771 | 2/2006 |
| JP | 2008-024561 | 2/2008 |
| KR | 10-2000-0035121 | 6/2000 |
| KR | 10-2005-0049504 | 5/2005 |
| RU | 2011488 C1 | 4/1994 |
| RU | 2406591 C2 | 12/2010 |
| SU | 1430201 A1 | 10/1988 |
| UA | 19721 C2 | 12/1997 |
| UA | 27359 C2 | 9/2000 |
| WO | WO-2010/131734 A1 * | 11/2012 |
| WO | WO-2012/148233 A2 * | 11/2012 |

* cited by examiner

METHOD FOR OBTAINING A CONFIGURATION FOR JOINING A CERAMIC MATERIAL TO A METALLIC STRUCTURE

CROSS-REFERENCE TO RELATED APPLICATIONS

This application claims priority to European application 13163603.7 filed Apr. 12, 2013, the contents of which are hereby incorporated in its entirety.

TECHNICAL FIELD

The present invention relates to a configuration for joining a ceramic thermal insulating material to a metallic structure, preferably used in hot gas environments. The invention also refers to, a method for obtaining such a configuration.

BACKGROUND

When operating in hot gas environments, joining a ceramic thermal insulating material to a metallic structure requires a good control of the stress level in the ceramic thermal insulating material in order to avoid premature failure of the ceramic material. In order to achieve this, it is interesting to design the joint of the ceramic material and metallic material for the highest possible temperature, in order to minimize the required thickness of the ceramic thermal insulating material, such that the thermal stresses in such ceramic material part are reduced, as they are directly related to the temperature gradient on said part. The benefit of a high temperature joint on the thermal gradient in the ceramic layer is counterbalanced by a higher stress level at the joint due to the difference of thermal expansion coefficients of the ceramic and of the metallic substrate. Besides, the higher the temperature of the metallic material during operation, the higher the oxidation rate of the metallic material will be; therefore, the metallic material composing the joint needs to have a high oxidation resistance.

It is known in the state of the art to join a ceramic thermal insulating material to a metallic structure by means of brazing of the ceramic part to the metallic part, using active brazing, reactive air brazing or metallization of the ceramic material. However, all these known solutions are limited in temperature capability, either due to the low melting point of the active braze alloys that are used (based on Ag or Au) when active or reactive air brazing is used, or due to the poor oxidation resistance of the metal used when metallization of the ceramic material is done, this metal used for metallization being typically Mo or Mn.

Another possibility known in the art is to join the ceramic material and the metallic material by means of mechanical joining: this solution allows the selection of the materials to be used specifically for their functional properties with minimum constraints on materials compatibility. However, when a mechanical joining solution is used, the problem is that stress concentration occurs at the joining location, which leads to a local risk of cracking of the ceramic material, which can propagate catastrophically through the whole ceramic material, leading to its premature failure.

Other solutions known in the art are, for example, fitting the ceramic in a metallic clamping system, having the problems as described for the mechanical joining stated above, or using high temperature cements, presenting the problem of a brittle joining layer with limited mechanical properties subjected to high stress levels, leading to possible local cracking that can propagate and cause a premature failure of the ceramic material.

The present invention is directed towards providing a joining configuration that solves the above-mentioned problems in the prior art.

SUMMARY

According to a first aspect, the present invention relates to a configuration for joining a ceramic layer comprising a thermal insulating material to a metallic layer, the configuration being used in hot gas environments. The configuration of the invention comprises an interface layer made of metallic material, located between the ceramic layer and the metallic layer, comprising a plurality of interlocking elements on one of its sides, facing the ceramic layer. According to the configuration of the invention, the ceramic layer comprises a plurality of cavities aimed at connecting with the corresponding interlocking elements of the interface layer. The configuration of the invention also comprises a brazing layer, by means of which the interface layer is joint to the metallic layer.

The invention also refers to a method for obtaining a configuration as the one described above. The method of the invention configures the interface layer comprising a plurality of interlocking elements on one of its sides, facing the ceramic layer, by means of a laser metal forming process.

BRIEF DESCRIPTION OF DRAWINGS

The foregoing objects and many of the attendant advantages of this invention will become more readily appreciated as the same becomes better understood by reference to the following detailed description when taken in conjunction with the accompanying drawings, wherein.

DETAILED DESCRIPTION

Figure 1:
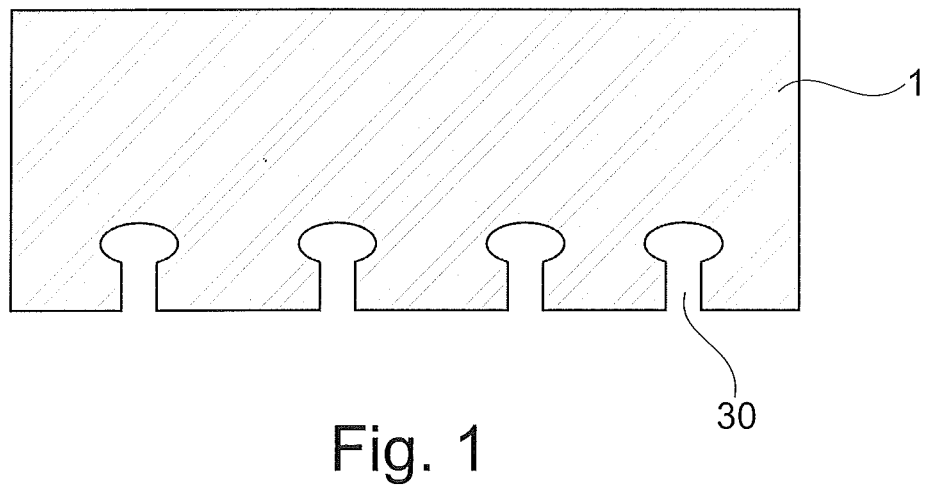
FIG. 1 shows a schematic view of the ceramic layer in the configuration for joining a ceramic layer comprising a thermal insulating material to a metallic layer according to the present invention.
Figure 2:
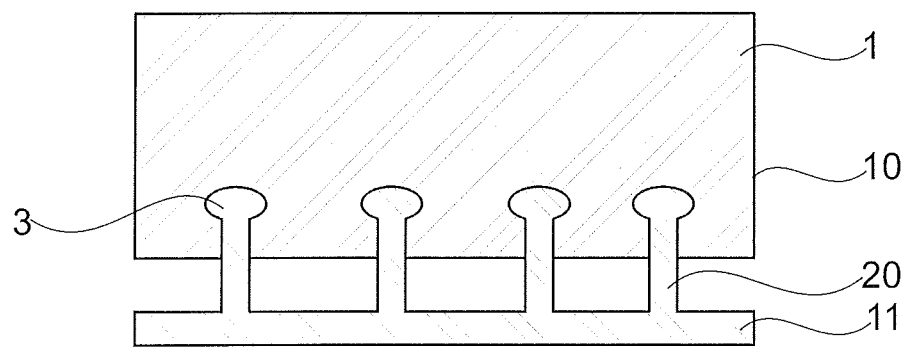
FIG. 2 shows a schematic view of the ceramic and the interface layer in the configuration for joining a ceramic layer comprising a thermal insulating material to a metallic layer according to the present invention.
Figure 3:
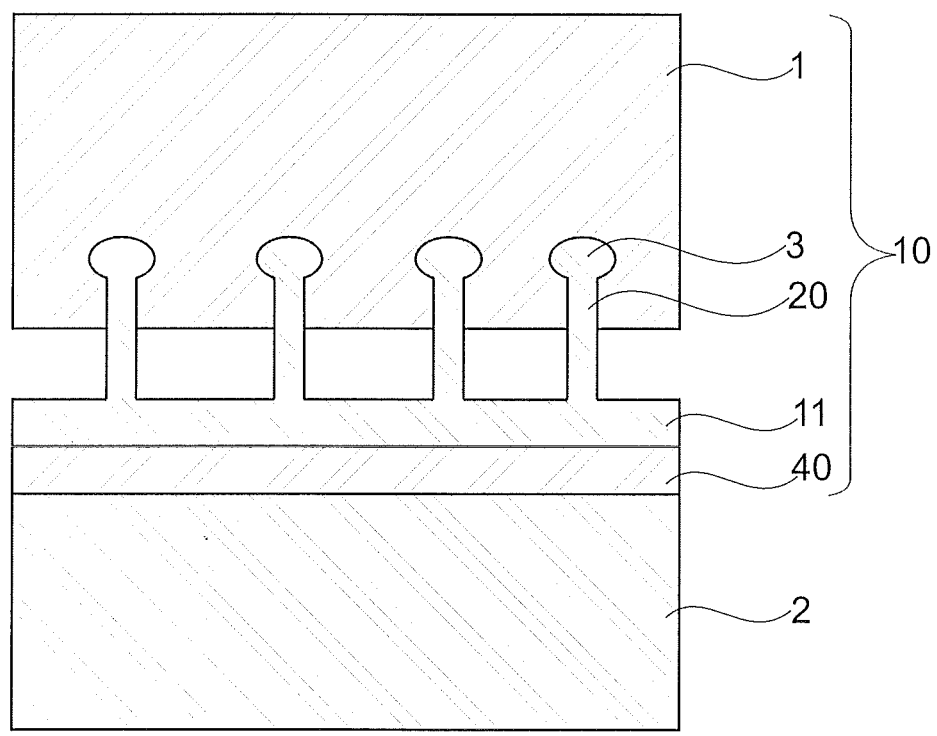
FIG. 3 shows a schematic view of the in the configuration for joining a ceramic layer comprising a thermal insulating material to a metallic layer according to a first embodiment of the present invention.
Figure 4:
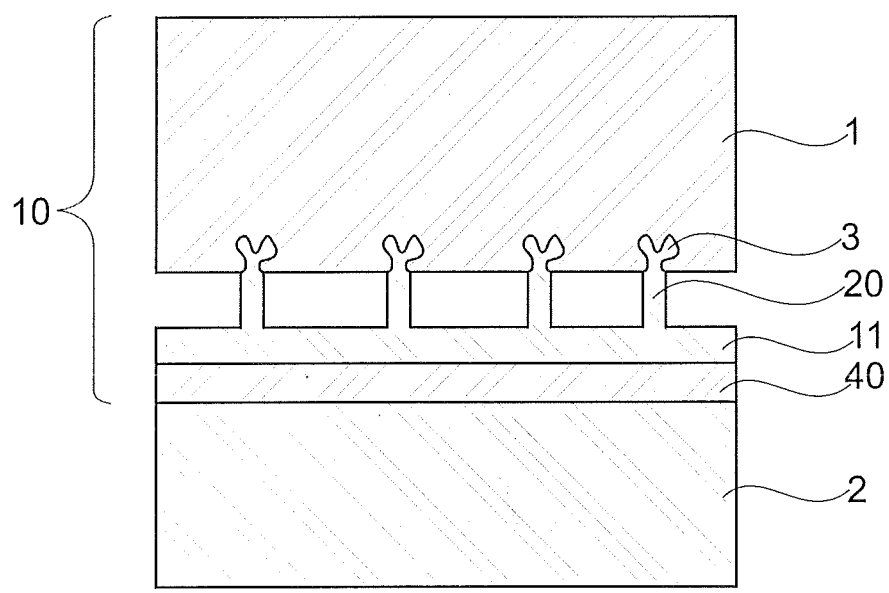
FIG. 4 shows a schematic view of the in the configuration for joining a ceramic layer comprising a thermal insulating material to a metallic layer according to a second embodiment of the present invention.
Figure 5:
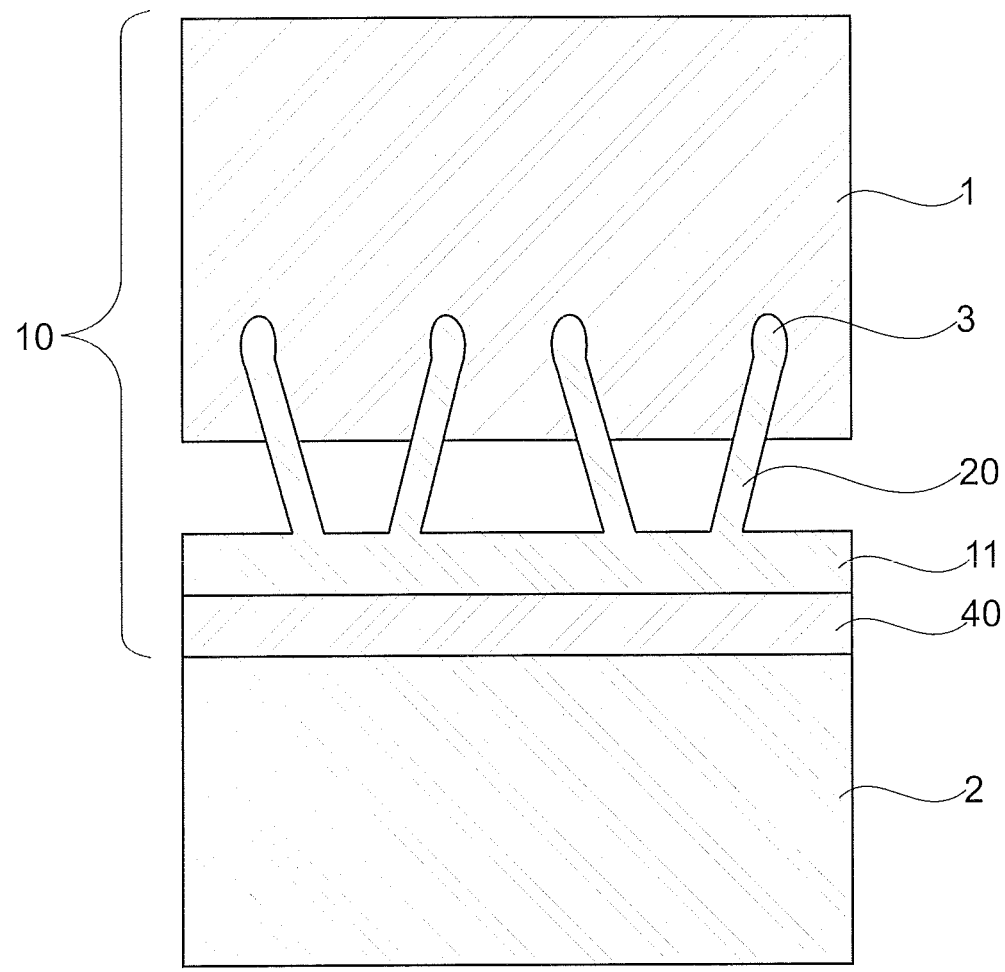
FIG. 5 shows a schematic view of the in the configuration for joining a ceramic layer comprising a thermal insulating material to a metallic layer according to a third embodiment of the present invention.

According to a first aspect, the present invention relates to a configuration 10 for joining a ceramic layer 1 comprising a thermal insulating material to a metallic layer 2, the configuration 10 being used in hot gas environments, typically in gas turbine environments. The configuration 10 comprises an interface layer 11 made of metallic material, located between the ceramic layer 1 and the metallic layer 2, comprising a plurality of interlocking elements 20 on one of its sides, facing the ceramic layer 1. According to the configuration of the invention, the ceramic layer 1 comprises a plurality of cavities 30 aimed at connecting with the corresponding interlocking elements 20 of the interface layer 11. The configuration 10 of the invention also comprises a brazing layer 40, by means of which the interface layer 11 is joint to the metallic layer 2.

The invention also refers to a method for obtaining a configuration 10 as the one described above. The method of the invention configures the interface layer 11 comprising a plurality of interlocking elements 20 on one of its sides, facing the ceramic layer 1, by means of a laser metal forming process, as it will be further explained.

Figure 6:
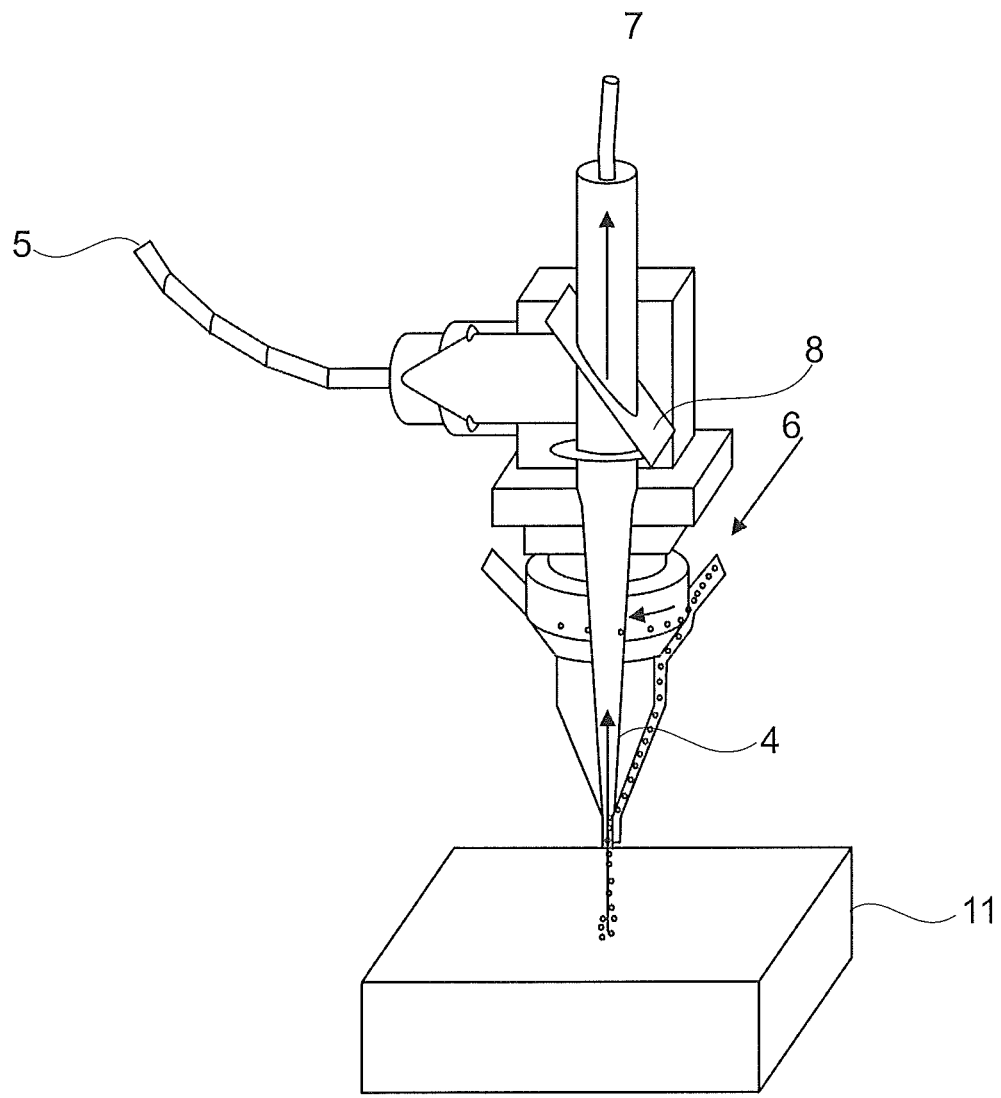
FIG. 6 shows a schematic view of the method of the invention, for configuring the interface layer in the configuration for joining a ceramic layer comprising a thermal insulating material to a metallic layer according to the present invention.

In order to reduce the stress concentration at the joining location, a robust joining design with the configuration 10 of the invention is proposed, having a high number of joining contacts (interlocking elements 20 and cavities 30); besides, the geometry of the joints is such as to reduce the residual stresses. In order to achieve this, the ceramic layer 1 is manufactured such as to have cavities 30 in itself (see FIG. 1) and the interface layer 11 is then manufactured to fill these cavities 30, leading to an interlocking between the ceramic layer 1 and the interface layer 11. The manufacturing of the interface layer 11 has therefore to be accurately adapted to the shape of each one of the cavities 30 in the ceramic layer 1. This can be achieved in several possible ways:

1) The ceramic layer 1 is directly produced with cavities 30 including interlocking features such as overhangs 3. Each part that is produced is scanned with a suitable optical device, for example a 3D photo-grammetric scanner and a reference position of each one of the cavities 30 is saved in a data file together with an identification number corresponding to the number of the part. In a second step, an automated laser metal forming operation is performed, where a powder nozzle 4 being fed with powder and gas 6 is positioned at the reference positions where the interlocking elements 20 have to be located, the powder being locally re-molten with a focus laser beam 5, allowing the locally molten metallic powder to fill the cavities produced, as shown in FIG. 6. The positioning of the powder nozzle 4 can be made either with a robot or with a CNC (computer numerical control).

2) Another possibility is to make a first step in which a short pulse laser machining operation is performed to create the cavities 30 on the surface of the ceramic layer 1. Preferably, ns or ps pulses are chosen to create clean cavities 30 free of melt and without crack formation in the ceramic layer 1. The second step is similar to the one described already in 1) above: however, no scanning is necessary because the previous machining positions can be directly used as target positions for the laser metal forming step.

Using one of the two methods described above, a variety of shapes can be created as interlocking elements 20, as shown in different embodiments of the invention, shown on FIGS. 3 to 7. Depending on the required strength of the joint and the functional requirements of the configuration 10, number and density and the degree of coverage of the ceramic layer 1 by interlocking elements 20 can be tailored. Another possibility is to have the cavities 30 filled with metal so that the metallic filler protrudes from the ceramic layer 1 forming metallic struts. With an additional grinding or milling operation, a defined offset between the surfaces of the ceramic layer 1 together with the interface layer 11 with respect to the metallic layer 2 can be produced avoiding premature failure due to the reduced stress level at the points of contacts between the ceramic layer 1 and the metallic filler due to the low stiffness of the metallic struts.

The laser metal forming material is very flexible with respect to the filler material, preferably the metallic filler material. As an example, high temperature Ni-based braze powders with high service temperature capability and good oxidation resistance, such as the commercially available braze alloys Amdry 915 or Amdry 103 can be chosen as the filler material. Because the laser/powder nozzle 4 or the ceramic layer 1 can be tilted, there is a high flexibility with respect to the shapes of the interlocking elements 20.

As an alternative (see FIG. 1), a powder blend of high strength superalloy and high temperature braze material can be used. In both cases, the ceramic layer 1 interlocking with the interface layer 11 can be directly joined to the metallic layer 2 acting as carrier structure. If a defined offset between the two surfaces (ceramic layer 1 together with interface layer 11 and metallic layer 2) needs to be ensured, a super solidus brazing of the ceramic layer 1 and interface layer 11 together with the metallic layer 2 can be envisaged. In this case, the brazing temperature is set at an intermediate value between the filler alloy's solid and liquid temperature. As a consequence, only a small fraction of the filler is molten and the metallic joints (interlocking elements 20) maintain their shape ensuring the correct offset between the ceramic layer 1 together with interface layer 11 and metallic layer 2.

As a preferred embodiment (see FIG. 2, 3, 4, 5 or 7), a superalloy with high temperature capability is used as the filler material. Depending on the local requirements, materials with superior oxidation resistance, corrosion resistance, excellent mechanical strength, or a suitable combination of these properties can be chosen like Amdry 995, Amdry 963, Haynes 230 or Inconel 738. In this case, an additional brazing layer 40 has to be applied between the metallic layer 2 and the ceramic layer 1 joined to the interface layer 11. However, the high area coverage of the ceramic layer 1 with the interface layer 11 greatly improves the wettability and makes the brazing much more reliable. Therefore, the flexibility with respect to the brazing material used to configure the brazing layer 40 is higher and high temperature braze foils with much higher service temperature can be chosen. A defined gap can be built by selecting the length of the interlocking elements 20 such to define metallic struts between the ceramic layer 1 and the interface layer 11. These struts have a low stiffness and can be designed such that the stress level at the points of contacts between the interlocking elements 20 and the ceramic layer 1 is low enough to avoid crack formation and crack growth in the ceramic layer 1 either at room temperature or during service.

In all cases, excessive heat input to the ceramic layer 1 has to be avoided, because overheating could cause local cracking or other damage. In order to ensure this, a closed loop control of the laser powder melting operation can be implemented (see FIG. 6): in this case, a pyrometer 7 is integrated into the laser powder nozzle 4 which continuously measures the temperature of the local melt pool. The temperature values are analyzed in real time and fed back to the laser power control unit, which automatically adjusts the power level to maintain the optimum temperature for the melting process. Preferably, a beam shaping optics 8 producing sub-mm laser spot diameter is used for this process. For a better balance of the heat input, an additional fast beam oscillation can be implemented by using a galvanometer scanner, integrated in the beam shaping optics 8.

Figure 7:
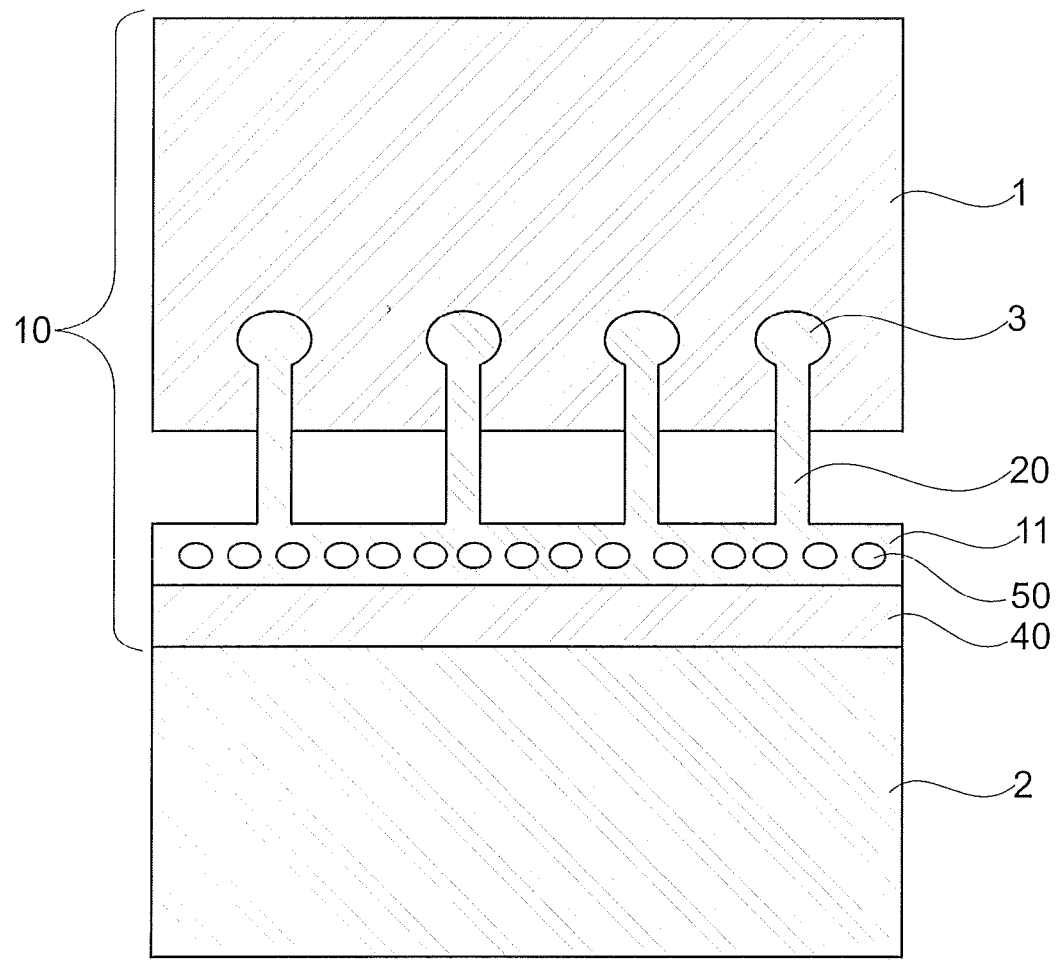
FIG. 7 shows a schematic view of the in the configuration for joining a ceramic layer comprising a thermal insulating material to a metallic layer according to a fourth embodiment of the present invention.

In another embodiment of the invention, the ceramic layer 1 comprises the protruding metallic filler material shaping the interlocking elements 20: this ceramic layer 1 is used as a starting preform for an additive manufacturing process, which can be used to build the interface layer 11 between the ceramic layer 1 and the metallic layer 2. In particular, this operation can be accomplished by Selective Laser Melting (SLM) inside a work chamber with controlled atmosphere. For this purpose, the ceramic layer 1 is introduced in the SLM chamber parallel to the powder deposition plane. The selective laser melting is carried out in such a way that the new material is formed starting with the interface layer 11. As a particularly interesting option, conformal (near wall) cooling channels 50, as shown in FIG. 7, can be introduced in close proximity to the hot interface between the ceramic layer 1 and the metallic layer 2: the resulting hybrid ceramic/metal compound is then brazed to the metallic layer 2 as described above.

Using one of the manufacturing sequences or steps described above, large quantities of standardized ceramic layer 1/interface layer 11 elements having the configuration 10 of the present invention can be produced, which can then be securely bonded to a large metallic layer 2, such as, for example, a combustor liner in a gas turbine.

The main advantages of the method of the invention using laser metal forming/selective laser melting process allows to build a mechanical joint between a ceramic layer 1 and a metallic structure 2 (carrier structure) with very low residual stresses and minimized stress concentration in the ceramic layer 1. The joint design allows accommodating the strains due to the thermal mismatch between the ceramic insulation material configuring the ceramic layer 1 and the metallic layer 2. Additional strain compliance can be introduced by choosing a filler material which has adequate ductility within the targeted operation range.

Besides, at least in one embodiment of the method of the invention, the ceramic layer 1 does not need machining prior to joining and the variability of the ceramic's shape due to manufacturing tolerances and other effects like uncontrolled shrinkage during the sintering of the ceramic material before it being shaped (called green ceramic material) are compensated by the flexible laser metal forming step in combination with 3D scanning. The localized heating during the forming of the metallic joint also reduces the thermal shock intensity in the ceramic layer 1 during the manufacturing. All these benefits reduce the probability of pre-cracking the ceramic material during the joining of the ceramic layer 1 together with the interface layer 11 and the metallic layer 2. Moreover, the process of the invention reduces crack formation during high temperature operation and transient loads: this reduces the probability of premature failure of the ceramic material.

Although the present invention has been fully described in connection with preferred embodiments, it is evident that modifications may be introduced within the scope thereof, not considering this as limited by these embodiments, but by the contents of the following claims.

The invention claimed is:

1. A method for obtaining a configuration for joining a ceramic layer including a thermal insulating material to a metallic layer using an interface layer made of metallic material, the interface layer being located between the ceramic layer and the metallic layer, and including a plurality of interlocking elements on a side that faces the ceramic layer, the plurality of interlocking elements being connectable to a plurality of cavities in the ceramic layer; the method comprising:

joining the ceramic layer to the metallic layer by producing the interlocking elements in the metallic material interface layer through a laser metal forming process.

2. The method according to claim 1, wherein the ceramic layer is manufactured with cavities comprising overhangs, the ceramic layer being further scanned with an optical device, such that a reference position of each one of the cavities together with an identification number corresponding to the number of the part is saved, after which an automated laser metal forming operation is performed, where a powder nozzle fed with powder and gas is positioned at the reference positions where the interlocking elements have to be located, the powder being locally molten with a focus laser beam, allowing the locally molten metallic powder to fill the cavities produced.

3. The method according to claim 2, wherein the positioning of the powder nozzle is made with a robot or with a CNC (computer numerical control).

4. The method according to claim 1, wherein, in a first step, a pulse laser machining operation is performed to create the cavities on the surface of the ceramic layer, a second step of automated laser metal forming operation being then performed, a powder nozzle fed with powder and gas being positioned at the reference positions where the interlocking elements have to be located, the powder being locally re-molten with a focus laser beam, allowing the locally molten metallic powder to fill the cavities produced.

5. The method according to claim 4, wherein the pulse laser machining operation uses nanosecond pulses or picosecond pulses.

6. The method according to claim 1, wherein the metallic filler material used in the laser metal forming process of the interface layer comprises high temperature Ni-based braze powders with high service temperature capability and good oxidation resistance, the Ni-based braze powders including braze alloys.

7. The method according to claim 1, wherein a powder blend of high strength superalloy and high temperature braze material are used in the laser metal forming process of the interface layer.

8. The method according to claim 1, wherein the ceramic layer interlocking with the interface layer are directly joined to the metallic layer, such that a defined offset between the two surfaces is ensured, with a super solidus brazing of the ceramic layer and the interface layer together with the metallic layer.

9. The method according to claim 1, further comprising a closed loop control of the laser powder melting operation, such that a pyrometer is integrated into the laser powder nozzle, continuously measuring the temperature of the local melt pool.

10. The method according to claim 1, wherein the ceramic layer is used as a starting preform for an additive manufacturing process, used to build the interface layer between the ceramic layer and the metallic layer by Selective Laser Melting (SLM) inside a work chamber with controlled atmosphere, such that the ceramic layer comprises the protruding metallic filler material shaping the interlocking elements.

\* \* \* \* \*